(12) United States Patent
Jetten et al.

(10) Patent No.: US 8,480,950 B2
(45) Date of Patent: Jul. 9, 2013

(54) DEVICE AND METHOD FOR OBTAINING NON-FERROUS METALS

(75) Inventors: Peter C. Jetten, Oud-Beijerland (NL); E. J. B. de Winter, Twello (NL)

(73) Assignee: Pyrotek, Inc., Spokane, WA (US)

( * ) Notice: Subject to any disclaimer, the term of this patent is extended or adjusted under 35 U.S.C. 154(b) by 103 days.

(21) Appl. No.: 12/451,735

(22) PCT Filed: May 28, 2008

(86) PCT No.: PCT/NL2008/050322
§ 371 (c)(1),
(2), (4) Date: Apr. 28, 2010

(87) PCT Pub. No.: WO2008/147188
PCT Pub. Date: Dec. 4, 2008

(65) Prior Publication Data
US 2010/0288076 A1 Nov. 18, 2010

(30) Foreign Application Priority Data
May 31, 2007 (EP) .................................. 07109322

(51) Int. Cl.
*F27B 7/12* (2006.01)
*F27B 7/16* (2006.01)
*F27B 7/10* (2006.01)

(52) U.S. Cl.
USPC ........... 266/173; 266/142; 266/276; 266/213; 266/274; 266/248

(58) Field of Classification Search
USPC .................. 266/173, 142, 276, 213, 274, 248
See application file for complete search history.

(56) References Cited

U.S. PATENT DOCUMENTS

| 3,468,524 | A |   | 9/1969  | Haack            |         |
|-----------|---|---|---------|------------------|---------|
| 3,836,324 | A |   | 9/1974  | Shaefer et al.   |         |
| 3,984,090 | A | * | 10/1976 | Swartz           | 266/227 |
| 5,928,602 | A | * | 7/1999  | Linnainmaa et al.| 266/200 |

FOREIGN PATENT DOCUMENTS

| EP | 0 828 858 B1 | 12/1999 |
| EP | 1079191 A1   | 2/2001  |
| FR | 1063007 A    | 4/1954  |
| WO | WO96/34119   | 10/1996 |

\* cited by examiner

*Primary Examiner* — George Wyszomierski
*Assistant Examiner* — Tima M McGuthry Banks
(74) *Attorney, Agent, or Firm* — Wells St. John PS

(57) ABSTRACT

Device and method for separating metals and metal oxides thereof, in particular in non-ferrous alloys, such as zinc. To this end, zinc residues (dross) is placed in a rotary drum and heated. After a certain treatment time, pure metal located in the bottom part of the drum is poured out. The invention proposes that the drum be held rotatably on a drive mechanism arranged in the cover of the furnace. This facilitates handling of the drum, more particularly when placing it on its drive mandrel. As a result, it is possible to use larger drums, resulting in a larger capacity and a more efficient process.

10 Claims, 4 Drawing Sheets

DEVICE AND METHOD FOR OBTAINING NON-FERROUS METALS

CROSS REFERENCE TO RELATED APPLICATION

Figure 1:
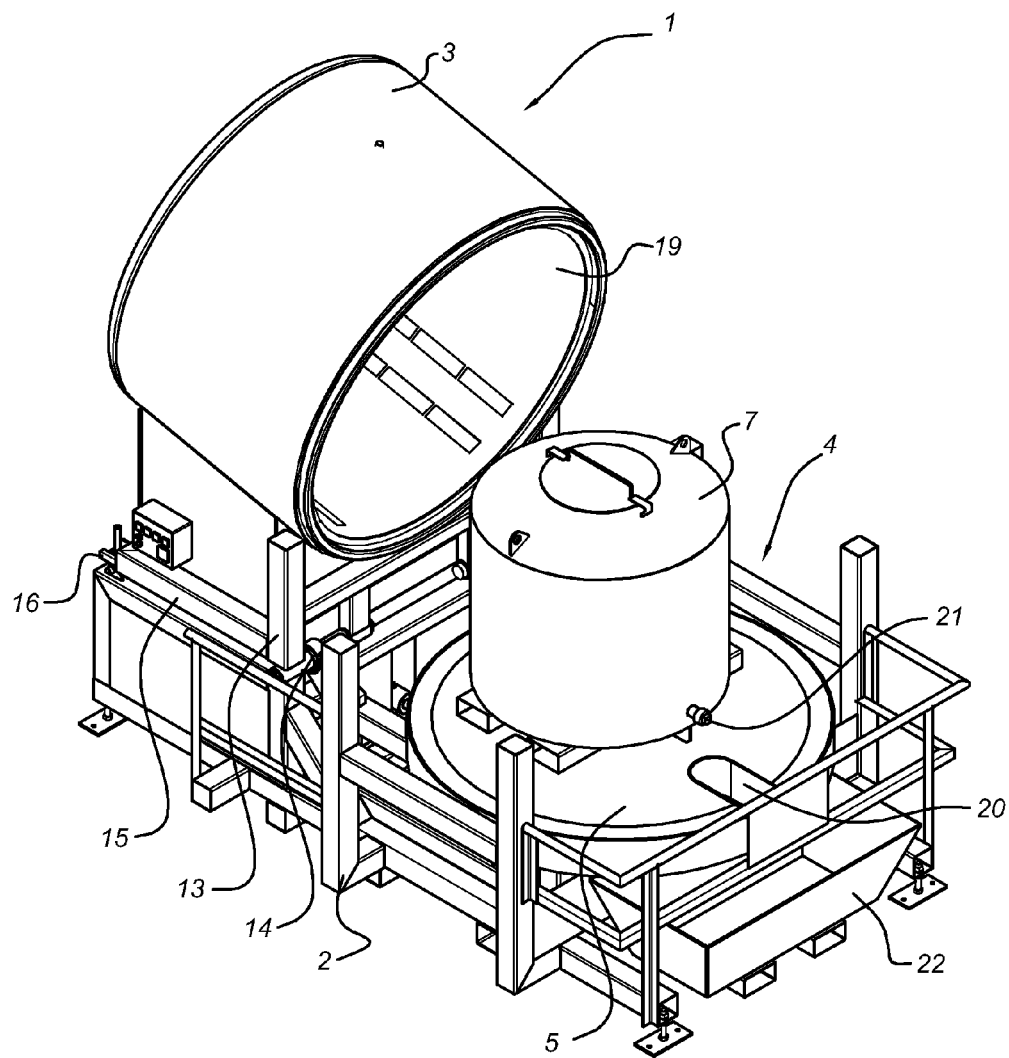

This is a 35 U.S.C. §371 application of and claims priority to International Application No. PCT/NL2008/050322, which was filed on May 28, 2008, and which claims priority to European Patent Application No. 07109322.3, which was filed on May 31, 2007, and the teachings of all the applications are incorporated herein by reference.

The present invention relates to a device for obtaining non-ferrous metals from mixtures of non-ferrous metals and oxides according to the preamble of claim 1.

A device of this type is known from EP 0 828 858 B1. This document describes a furnace wherein the furnace housing is provided with a receiving mandrel for a drum. Drums containing non-ferrous metal residues are moved into the furnace housing and pushed on to the drive mandrel, for example with a fork-lift truck. Then, a cover or lid is closed against the furnace housing and the process can take place. After sufficient separation has been achieved, with the furnace closed, an opening which communicates with an opening in the side wall of the drum (which must be in the correct rotational position) is opened up in the housing and then the metal is tapped.

Both the step of positioning the drum on the mandrel and the step of tapping metal require care and attention and cannot be carried out by untrained staff. Moreover, the method of handling imposes limits on the dimensions of the drum.

U.S. Pat. No. 3,468,524 discloses a device wherein a ring-shaped furnace housing is provided which is made from two semi-cylindrical parts. In the cylindrical furnace housing a pot or drum is provided which can rotate. One side (loading side) of the pot is open whilst the other side of the drum provides the closure. If for some reason the drum has to be removed from the furnace the furnace housing is split.

The object of the present invention is to avoid these drawbacks and provide a furnace which can be operated in a simple way and wherein the risk of errors, with all the associated consequences, is minimized.

In a device of the type described above, this object is achieved with the features set forth in the claims.

According to the present invention, the drum is placed on the cover in the open position of the cover. The cover or lid will generally comprise a plate-like part, which will preferably be approximately horizontal in the fitting/removal position of the drum. In this position, it is relatively easy to place the drum on, for example, a drive mandrel of the drive means in the cover, certainly compared to placing the drum on a mandrel which is located in the preferably obliquely positioned housing of the furnace and is not visible during the positioning operation.

Although rotation of the drum can be carried out with any drive mechanism in or at the furnace, it is preferable for the drive mechanism to be incorporated in the cover, more particularly on the outer side of the cover. The final drive means for the drum, which is preferably a mandrel, extends through the wall of the cover. It is correspondingly easy to place the drum on a mandrel of this type. The drum can be put in place in the customary way using a fork-lift truck. It is also possible to attach a gantry track or the like. In any event, in the design according to the present invention, the drum is easy to access during the step of positioning it on the cover.

According to an advantageous embodiment of the invention, the furnace is arranged on a frame. More particularly, the furnace housing is transferred tiltably on to a frame, so that it can be tilted between a position of use as described above and a transport position. This transport position is more compact, and consequently in a particular embodiment of the invention it is possible for the furnace to be transported inside a standard container. As a result, one single furnace can be used at various locations without the need for further special measures.

According to a further advantageous embodiment of the invention, the discharge opening of the drum is arranged so as to extend through the cover. This means that when the cover is moved in order to be opened and closed, the drum is also moved between a position in which the separation of metal and dross takes place and a position in which it is easy to remove the metal from the drum. An opening formed in the drum can function as a vent in the position for separating metal and dross and then, when the cover with the drum arranged on it is tilted, can function as a pouring opening. This pouring opening can easily be arranged above an opening in the cover in the pouring position. Beneath this, it is in turn possible to position a receptacle or the like for receiving the metal obtained.

According to a further advantageous embodiment of the invention, the furnace housing is provided with a fan. After the remaining pure metal has been obtained, it is preferable (depending on the particular metal) for the remaining oxide to remain in the furnace for further rotary movement, in order for the residue as far as possible to be obtained in the form of a fine powder. However, for certain metals, such as zinc oxide, it is important for cooling of the residue to take place, and to this end it is preferable to use forced cooling. Cooling of this type can be obtained using fans. If fossil fuel is used as medium for heating the furnace, the fans used will generally be suitable for this purpose (in this case of course no fossil fuel is then being fed to the burner).

According to a further variant of the invention, the cover of the furnace, in this operating mode in which the powder is being comminuted and cooling is taking place, is open a few degrees.

The invention also relates to an assembly comprising the device described above together with a number of drums. These drums can be used at various locations for collecting the waste in question and can if desired be combined with the furnace in order to obtain the material in question.

The present invention also relates to a method for separating non-ferrous metals and oxides thereof, comprising placing a mixture of non-ferrous metals and oxides thereof in a drum, placing said drum in a furnace, rotating said drum during the heating of said furnace and tapping of the non-ferrous metal which is released, wherein said drum is secured rotationally to the cover of said furnace and is moved into and out of the furnace with the cover.

Although the furnace described above can be used for any conceivable material, it is preferably used for non-ferrous metals, in particular lead, zinc, tin or antimony.

Figure 2:
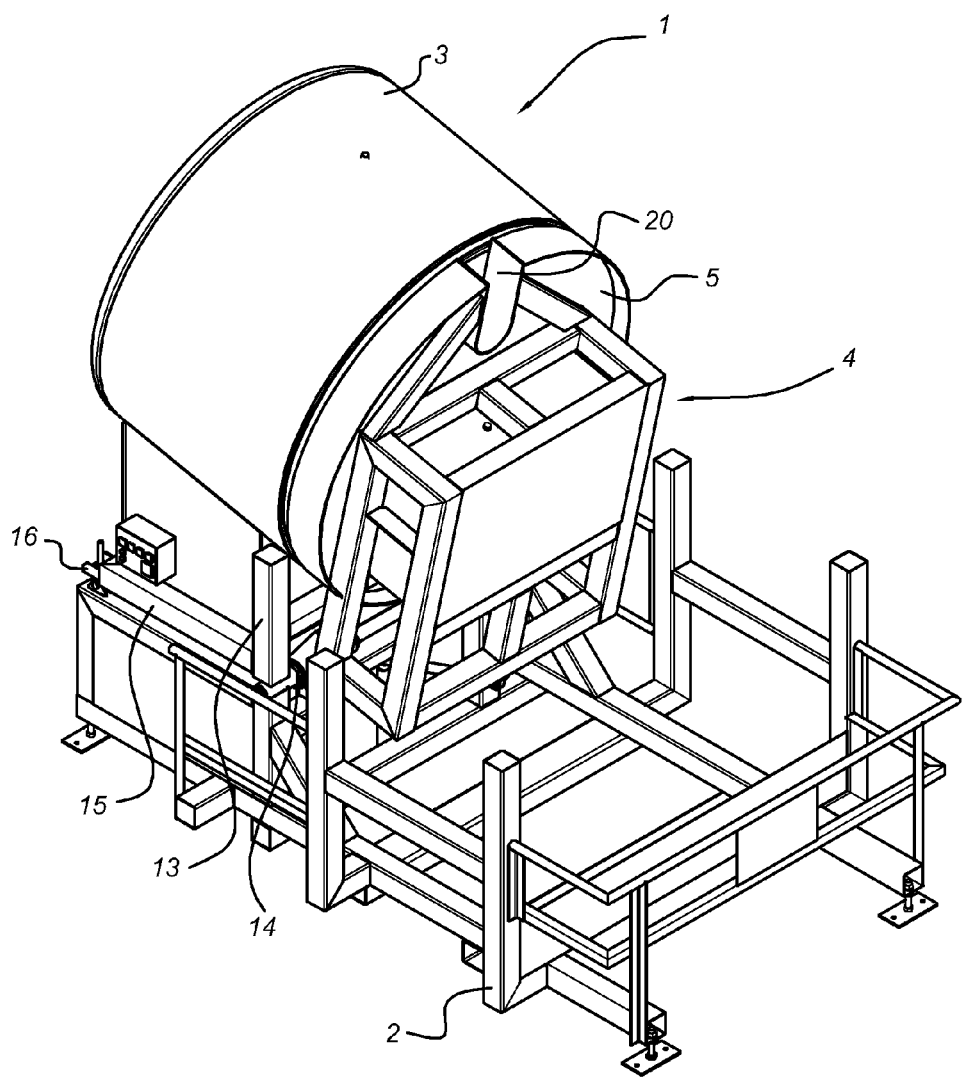
Figure 3:
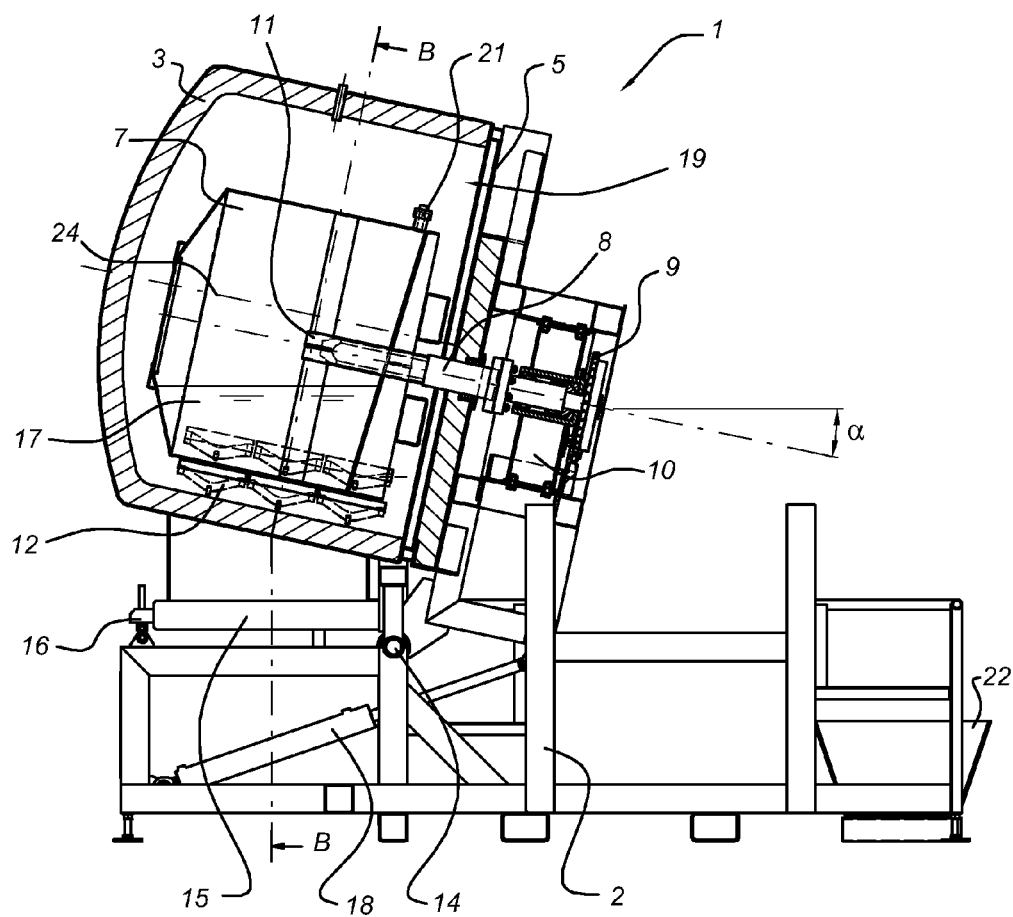
Figure 4:
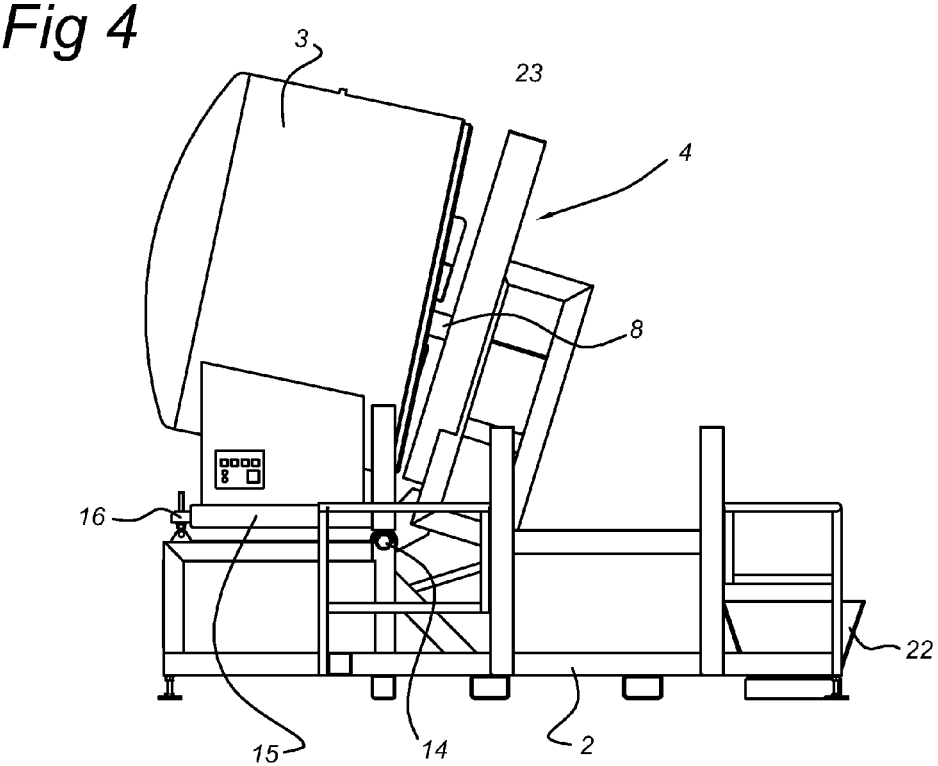

The invention will be explained in more detail below on the basis of an exemplary embodiment illustrated in the drawing, in which:

FIG. 1 diagrammatically depicts a perspective view of the furnace according to the present invention in the open position;

FIG. 2 shows the furnace from FIG. 1 in the closed position;

FIG. 3 diagrammatically depicts a cross section through the furnace from FIG. 2;

FIG. 4 diagrammatically depicts the furnace in the cooling position; and

Figure 5:
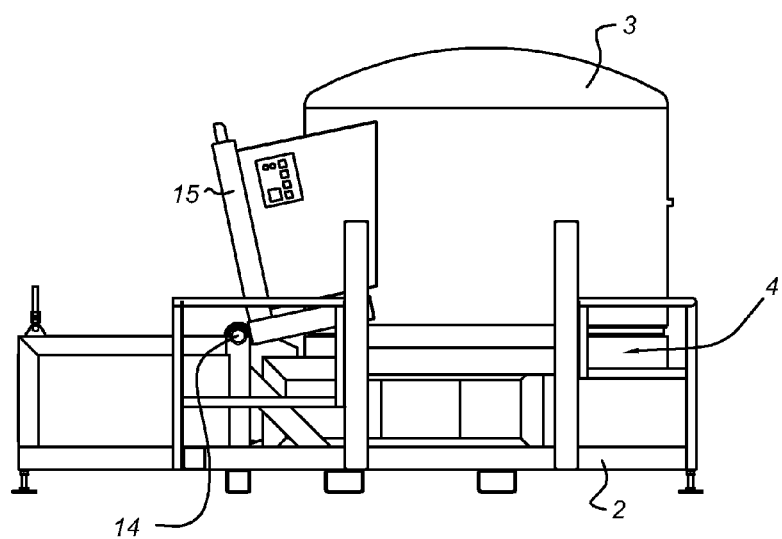

FIG. 5 shows the furnace in the transport position.

In the figures, 1 denotes a furnace according to the present invention. This furnace is arranged on a frame 2. The furnace comprises a furnace housing 3 and a cover 4. Furnace housing 3 can pivot about rotation point 14. The support 13 of the furnace housing 3 is rigidly connected to rod 15, which can be secured at connection 16.

Cover 4 can likewise pivot about rotation point 14. The movement thereof is controlled by jack 18, which on the other hand is supported on the frame 2. The movement path of the cover is realized using a control means which is not otherwise shown. The cover 4 comprises a cover plate 5 or lid which includes insulating ceramic material. A drive mandrel 8 extends through it and can be rotated, via a transmission 9, by a motor 10 likewise arranged in the cover plate 5.

There is a drum 7 which is provided with an internal sleeve 11 which can mate with mandrel 8 in such a manner that when mandrel 8 rotates drum 7 likewise rotates. Material 17 that is to be treated can be arranged in the drum.

The furnace housing is provided with infrared radiators 12 which provide heating. The opening which the cover 4 closes off is denoted by 19. Drum 7 is provided with an opening 21. This opening 21 can be closed and serves as a pouring opening. As can be seen from FIG. 1, in the pouring position this opening 21 is located above outlet 20, which is in turn located above receptacle 22, which collects the metal to be obtained. The outlet 20 also serves as a vent opening.

The device described above operates as follows. Starting from the position shown in FIG. 1, there is no drum 7 on the mandrel 8. Then, a drum 7 filled with the material mixture that is to be separated is arranged on the mandrel with a fork-lift truck, crane or other equipment. This positioning is relatively easy to achieve, since in the position shown in FIG. 1 the drum is accessible from all sides when it is being placed on mandrel 8. Then, cover 4 with the drum 7 located on mandrel 8 is completely closed against housing 3 with jack 18, producing the position shown in FIGS. 2 and 3. In this position, the axis of rotation of drum 7, which is denoted by 24, extends at an angle α with respect to the horizontal. This angle is preferably between 5 and 45°, and is more particularly approximately 10-20°. During rotation, the furnace is heated, thereby heating the contents 17 of the drum 7 being inside the furnace. Heating takes place as a function of the desired metal. Depending on the desired metal and the composition of the mixture with the oxide, sufficient separation between the metal and the oxide is achieved after a certain time, such as a few hours. According to the present invention, the purified metal is then removed from the furnace by virtue of the cover being moved back into the position shown in FIG. 1. Then, the opening 21 is opened, after which the metal passes via outlet 20 into receptacle 22. Thereafter, oxide (dross) remains in the furnace. It may be desirable for this oxide to be comminuted. In this case, after the pure metal has been removed, the cover is moved back to the closed position. However, for certain metals, complete closure is not effected, but rather movement to the position shown in FIG. 4, in which a gap 23 remains between the cover 4 and the furnace housing 3. In this position, rapid cooling of the drum takes place during rotation of this drum. This can be promoted by the provision of fans (not shown).

Of course, there is a control means for the motor 10 and the required safety features are also present, in order to prevent incorrect operation.

With the present invention, it is possible to provide furnaces in which the drum can be of any desired size, since the drum is easier to handle than what is known from the prior art.

It is possible for the device described here to be designed as a mobile device. Since in such a case the dimensions of the furnace make transport more difficult, it is possible for the furnace housing to be tilted into the position shown in FIG. 5. As a result of the securing at 16 being released, the furnace housing can be tilted, resulting in a more compact structure, which can be designed in such a manner that it can be transported in a standard container or on a lorry without exceeding the relevant height restrictions.

On reading the above description, a person skilled in the art will of course ascertain variants which lie within the scope of the present application. These are obvious and lie within the scope of the accompanying claims.

The invention claimed is:

1. Device for obtaining non-ferrous metals from mixtures of non-ferrous metals and oxides, comprising a furnace housing with a drum arranged rotatably therein, wherein an axis of rotation of the drum forms an angle (α) of 5-45° with a horizontal plane, said drum being displaceable into said furnace housing for loading said mixture of non-ferrous metals and oxides and said drum being displaceable out of said furnace housing on and by a rotary drive for said drum, and wherein said furnace housing is provided with a closure cover for closing an opening for loading said mixtures of non-ferrous metals and oxides, characterized in that said rotary drive is accommodated in said cover, an internal opening in the furnace housing is dimensioned such that when said closure cover is closed, with the drum arranged on the closure cover, said drum does not touch the furnace housing.

2. Device according to claim 1, and further wherein said furnace housing is arranged tiltably.

3. Device according to claim 1 wherein said cover is provided with a metal discharge.

4. Device according to claim 3, and further wherein said metal discharge opening comprises a vent.

5. Device according to claim 1, and further wherein the furnace housing is provided with at least one internal heater.

6. Device according to claim 5, and further wherein the at least one internal heater is an infrared heater.

7. Device according to claim 1 and further wherein said cover, during the rotation of said drum, can be placed in a position which is slightly opened with respect to the housing.

8. Device according to claim 1 and further wherein said rotary drive comprises a mandrel operatively attached to a motor shaft.

9. Device according to claim 8 and further wherein said mandrel is configured to mate with an internal sleeve of the drum and further configured such that it can be rotated by a motor.

10. Device according to claim 9 and further wherein the mandrel is configured to mate with an internal sleeve of the drum.

* * * * *